UNITED STATES PATENT OFFICE.

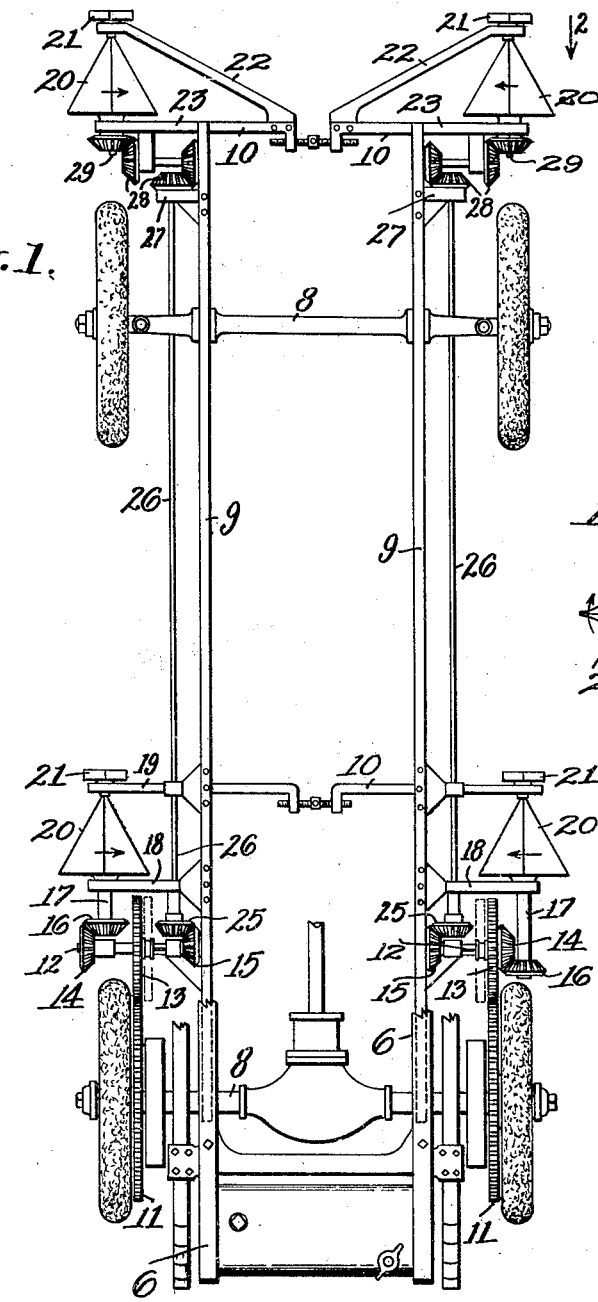

VICTOR ETHIER, OF WEBSTER, MASSACHUSETTS.

SNOW-REMOVING ATTACHMENT FOR AUTOMOBILES.

1,322,296.  Specification of Letters Patent.  Patented Nov. 18, 1919.

Application filed January 9, 1919. Serial No. 270,380.

*To all whom it may concern:*

Be it known that I, VICTOR ETHIER, a citizen of the United States, residing at Webster, in the county of Worcester and State of Massachusetts, have invented a new and useful Snow-Removing Attachment for Automobiles, of which the following is a specification.

This invention relates to a rotary snow plow for use on automobile trucks and pleasure cars. It is capable of general use but is intended to be used chiefly on country roads.

The principal objects of the invention are to provide means preferably associated with each wheel for steering and driving for removing the snow from the front of the same by the power of the car and delivering the snow away from the path of the wheel in such a direction as to avoid any possibility of its moving toward the car; also to provide a cutting device by which crust or icy snow can be penetrated. Further objects and advantages of the invention will appear hereinafter.

Reference is to be had to the accompanying drawing in which—

Figure 1 is a plan of a body and steering gear of an automobile truck with a preferred embodiment of this invention applied thereto, and Fig. 2 is a front view of the snow removing device.

I am aware of the fact that it has been proposed heretofore to place rotary snow plows in front of the wheels of cars running on tracks for the purpose of removing the snow from the tracks only. This invention has some similarity thereto because the snow instead of being removed from the entire front of the vehicle as is usually the case is removed only from the places where the wheels are to go, but these devices that I have mentioned most conveniently, and universally so far as I am aware, always place the rotary plows in front of the entire body of the car. This is not sufficient for an automobile in the most severe weather, so it is one object of this invention to provide a device of this character which can be placed along the side of the car in front of the driving wheels where it it most important, or in front of the front wheels if desired in addition to the driving wheels.

Other objects of the invention are to drive the snow plow at the front, if that is used, from the driving shaft at the rear, to provide a cutter for cutting through crust or ice, and to mount the device on an adjustable and detachable frame so that it can be used on cars of different sizes.

Referring to the drawing, it will be seen that I have illustrated merely the body or chassis 6 of a truck with the driving and front wheels. Detachably mounted below the chassis is a frame supported by the axles 8. This frame consists of longitudinal side bars 9 and cross bars 10 that are in two pieces adjustably connected to permit it to be used on broad and narrow cars. On the driving shaft are located two gears 11 and rigidly supported by a bracket on each of the longitudinal bars 9 of the frame is a transverse shaft 12 extending out far enough for a gear 13 on it to mesh directly with the gear 11. This gear 13 is slidable to bring it into and out of mesh with the gear 11. Each shaft 12 is provided with two bevel gears 14 and 15, one of which drives a bevel gear 16 on a shaft 17 parallel with the car itself and supported by brackets 18 and 19 carried by the bar 9. This shaft is provided with a conical snow scoop 20 which is formed of a plurality, preferably four, of straight rigid triangular arms or vanes. It rotates in such a way as to throw the snow away from the car. This prevents the snow being thrown toward the body of the car underneath. It is located in axial alinement with the plane of the driving wheels.

On the shaft 17 is also a rotary snow cutter 21 which is arranged to be readily removed and is to be used only in case of the presence of crust or very hard or icy snow. This rotates of course with the scoop and cuts through the ice or crust to form a path through which the scoop can act to remove it. It has rigid curved vanes which serve the purpose of cutting merely. Although it does throw snow away from the path of the wheels that is not its principal purpose.

The gear 15 drives a bevel gear 25 on a longitudinal shaft 26 supported by the bracket 18 and a bracket 27. By this means the gearing 28 drives a shaft 29 on which is another scoop 20 and cutter 21, this shaft being supported by brackets 22 and 23. The scoop and cutter are the same as the other ones described and these are repeated on the other side of the machine also.

I have not shown any means for disconnecting the power from the gear 11, but it will be understood that any ordinary means controlled from the car can be employed for that purpose.

The scoops 20 are shown as of conical form, being formed of four rigid triangular vanes as indicated in the drawings. They are made of strong construction so that they can throw the snow out at the side of the road as has been described. The cutters 21, however, are formed of sheet material preferably four arms being used, the two opposite arms together constituting an S-shape having their forward edges curved so as to dig into the hard crust or the like to cut it or break it.

Although I have illustrated and described only a single embodiment of the invention, I am aware of the fact that modifications can be made therein by any person skilled in the art without departing from the scope of the invention as expressed in the claims. Therefore I do not wish to be limited to all the details of construction herein shown and described, but what I do claim is—

1. The combination with an automobile of a rotary snow scoop located between the driving wheel and steering wheel thereof with its axis substantially in alinement with the plane of the center of the driving wheel, and means for rotating it from the driving wheel.

2. In an automobile, the combination with the body and a driving wheel, the body having brackets in front of the driving wheel, of a gear on the driving shaft adapted to be driven therefrom, gearing in mesh with said gear, a longitudinal shaft at the side of the truck supported by said brackets and in alinement with the plane of the driving wheel and forward thereof, a rotary scoop on said shaft, and means whereby said shaft is driven from said gearing in a direction to throw the snow out away from the body of the truck when passing through the snow.

3. The combination with an automobile, of a rotary snow scoop located immediately in front of the driving wheel thereof with its axis substantially in alinement with the plane of the center of the driving wheel, and means for rotating it from the driving wheel, said snow scoop consisting of a plurality of straight rigid vanes of triangular shape.

4. The combination with an automobile, of a rotary snow scoop located immediately in front of the driving wheel thereof with its axis substantially in alinement with the plane of the center of the driving wheel, means for rotating it from the driving wheel, and a cutter for breaking up crust and hard snow mounted on said scoop in front of it.

5. The combination with an automobile, of a rotary snow scoop located immediately in front of the driving wheel thereof with its axis substantially in alinement with the plane of the center of the driving wheel, means for rotating it from the driving wheel, a longitudinal shaft also driven from the driving shaft, and a second rotary snow scoop driven from the longitudinal shaft and located immediately in front of the front wheel in axial alinement with the first named scoop.

6. The combination with an automobile chassis and supporting wheels and axles of a frame mounted on said axles, a rotary snow scoop located immediately in front of the driving wheel thereof, means for rotating it from the driving wheel, a longitudinal shaft also driven from the driving shaft, and a second rotary snow scoop driven from the longitudinal shaft and located in front of the front wheel.

7. The combination with an automobile chassis and its supporting wheels and axles, of a frame movably supported directly by said axles, a rotary snow scoop located between the driving wheel and steering wheel and supported by said frame, and means on the frame for rotating it from the driving wheel.

8. The combination with an automobile chassis and its supporting wheels and axles, of a frame of adjustable width detachably mounted on said axles, a rotary snow scoop located in front of the driving wheel and supported by said frame, and means carried by the frame for rotating it from the driving wheel.

9. In an automobile truck, the combination with the chassis and a driving wheel, of a frame supported thereby and having brackets in front of the driving wheel, of a gear on the driving shaft adapted to be driven therefrom, gearing supported by said frame and adapted to be moved into mesh with said gear, a longitudinal shaft at the side of the truck supported by said brackets, a rotary scoop on said shaft, and means whereby said shaft is driven from said gearing in a direction to throw the snow out away from the body of the truck at the bottom.

10. An attachment for an automobile or truck, comprising a detachable adjustable frame, a rotary snow scoop supported thereby in front of the center of the driving wheel, and means on the frame for rotating the scoop from the driving wheel.

In testimony whereof I have hereunto affixed my signature.

VICTOR ETHIER.